Aug. 2, 1932.   C. W. WATKINS   1,869,727
DRAFT GAUGE
Filed Jan. 30, 1930
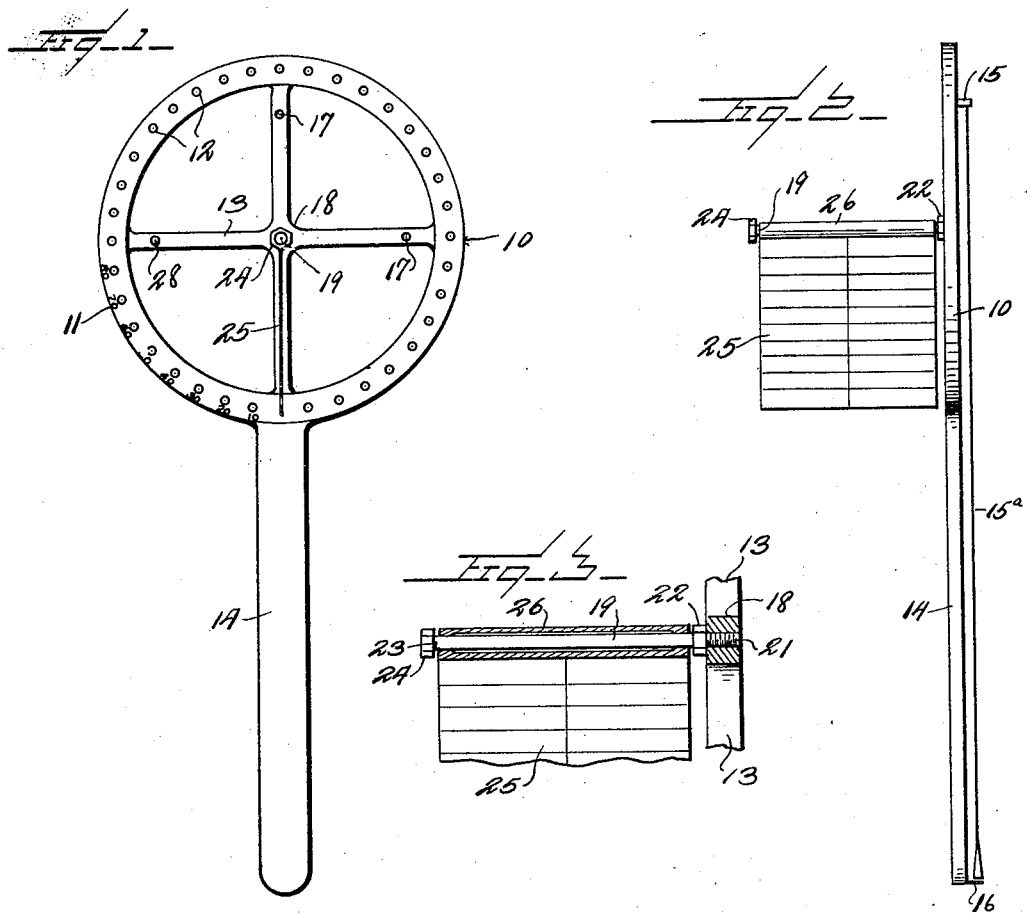
Inventor
C. W. Watkins
By Watson E. Coleman
Attorney Patented Aug. 2, 1932

1,869,727

UNITED STATES PATENT OFFICE

CHARLES WALTER WATKINS, OF KINGSTON, PENNSYLVANIA

DRAFT GAUGE

Application filed January 30, 1930. Serial No. 424,597.

The present invention relates to gauges and more particularly to gauges adapted for determining the velocity of air, water or any moving fluid.

An object of this invention is to provide a portable gauge of exceedingly simple construction by which any draft of air or the like may be properly measured so as to determine the velocity of air.

Another object of this invention is to provide in a gauge of this character means by which the device may be held in a vertical position so that the velocity of the air or fluid may readily be determined.

A further object of this invention is to provide in a device of this character a suitable chart having the desired indicia placed thereon, the chart coacting with the gauge so that the velocity of the air or water may readily be determined.

A still further object of this invention is to provide a device which may be readily and easily mounted in any air duct or the like, the device having suitable extensions by which the velocity of the air may be determined exteriorly of the duct.

A further object of this invention is to provide in combination with a gauge, means by which the velocity of the air may be recorded upon a suitable rotated or moving chart.

The above and various other objects and advantages of this invention will in part be described in and in part be understood from the following detailed description of the present preferred embodiment, the same being illustrated in the accompanying drawing wherein:—

Figure 1 is a detailed front elevation of a device constructed according to the preferred embodiment of this invention;

Figure 2 is a detailed side elevation of the device;

Figure 3 is a fragmentary longitudinal section partly in detail of the device.

Referring to the drawing wherein like numerals of reference designate corresponding parts throughout the several views, the numeral 10 designates a dial or annular member which is provided with a plurality of graduations or indicia 11 adjacent the periphery thereof and may also be provided with a plurality of spaced apertures 12 which are positioned about the dial and preferably spaced about ten degrees apart. The dial 10 is provided with a plurality of spokes or radially extending members 13 which preferably divide the dial or ring member 10 into quadrants, and the indicia placed upon the dial preferably indicate the degrees from ten to ninety in each of the quadrants. The dial 10 may be provided with a hollow handle member 14 which preferably aligns with a pair of the radially positioned spoke members 13, the dial member 10 having a rearwardly extending arm 15 so as to swingingly receive a depending plumb line 15a or the like.

The handle 14 may be provided with a suitable indicia or marking member 16 adjacent the bottom portion thereof which aligns with the center of the spoke members 13 so that when the handle 14 is positioned vertically, the plumb line 15a will be disposed above the indicating member 16. The spoke members 13 may be provided with apertures 17 which are positioned spaced inwardly from the inner periphery of the ring or dial member 10. The ring member 10 is provided with a hub portion 18, and a pivotal member 19 is adapted to threadably engage in the hub 18 and extend outwardly from the opposite end portions thereof.

The shaft or pivotal member 19 extends outwardly from the front portion of the dial member 10 and is provided with a threaded portion 21 adjacent the inner end portion thereof for receiving a nut or securing member 22. The shaft 19 is also provided with threads 23 at the outer end thereof and a nut member 24 threadably engages on the outer end portion of the shaft 19.

A wind or fluid engaging member 25 is adapted to be mounted upon the shaft 19, the wind-blown member 25 being provided with a sleeve 26 at the upper end portion thereof which loosely engages about the shaft or pivotal member 19 and the sleeve 26 is preferably disposed between the nut members 22 and 24 on the shaft 19, the nut members 22 and 24 being adapted to hold the sheet or swinging member 25 against longitudinal movement on the shaft. The sheet member 25 may be provided with suitable indicia being arranged in a plurality of columns or the like upon the face of the sheet, the indicia on the sheet coacting with the indicia 11 on the dial so as to determine the velocity of air or fluid. The dial 10 is provided with indicia indicating the various degrees and the sheet member 25 is provided with one column showing the degrees in numerical order and oppositely from these degrees there is indicated the speed of the air currents for each degree or series of degrees which are designated by the dial member so that when the draft member 25 is swung away from the vertical in either direction the reading can be taken from the dial and compared with the indicia on the sheet 25 so as to determine the exact flow of current within the passageway.

The draft member 25 is preferably of predetermined size and weight depending only upon the velocity of air, gas or liquid which it is desired to measure and is adapted to provide a substantially resisting member which swings or sways in the wind or gas. The draft member 25 may be constructed of any suitable material which is substantially rigid in construction and which will not be corrosively affected by the gas or air or by the fluid. While the device may be used for determining the velocity of a current of air, gas or the like which moves in a substantially horizontal plane, the upward or downward movement of air, gas or liquid may also be determined.

Where it is desired to measure or determine the flow of air or gas which moves downwardly or upwardly, a counter-weight or balancing member 27 is mounted on the sleeve member 26 oppositely from the draft member 25, the balancing member 27 being disposed substantially at right angles to the axis of the shaft 19 so as to offer substantially no resistance to the air or gas or to the swinging movement of the draft member 25. In determining the upward flow of a current, the handle member 14 is positioned in a vertical plane and the sheet 25 is swung into a substantially horizontal plane, being held in position by a pin member 28 which is removably positioned in one of the apertures 17 in the spoke member 13. The upward movement of the air will then swing the draft member 25 upwardly.

The device as shown in Figure 1 is particularly adapted for use in mine passageways where a continuous flow of air is provided. The air within the mine passageways is frequently deflected and the pressure reduced to such a proportion as to be exceedingly injurious or harmful to the mine workers, but there are no present available means by which the miners can determine whether the flow of air within the mines has been stopped or reduced, thus permitting the gas to accumulate and subsequently cause explosions.

Through the use of this device, the handle member 14 may be held in a vertical plane and the draft member 25 disposed into the current of air. The draft member 25 will be swung forwardly by the action of the moving current of air, and the sheet 25 will register the exact amount of air pressure or flow of air within the passageway. If the flow of air has been stopped, the draft member 25 will of course depend in a substantially vertical plane and the operator will immediately be aware of the fact that some obstruction has stopped the flow of air and immediate steps can be taken to insure the safety of the individuals within the closed passageway It will, of course, be understood that various changes and modifications may be made in the details of construction and design of the above specifically described embodiment of the invention without departing from the spirit thereof, such changes and modifications being restricted only by the scope of the following claim.

What is claimed is:—

A draft gauge of the character described comprising an annular apertured ring, a hub, a plurality of radially disposed apertured spoke members, a current engaging member, means for swingingly mounting said current engaging member axially of said hub for movement across one face of said ring, and a pin removably positioned in said apertures of said spokes, said pin being adapted to restrict the movement of said current engaging member.

In testimony whereof I hereunto affix my signature.

CHARLES WALTER WATKINS.